United States Patent [19]

Nguyen

[11] 4,309,393

[45] Jan. 5, 1982

[54] FLUIDIZED BED SULFUR DIOXIDE REMOVAL

[75] Inventor: Xuan T. Nguyen, Roxboro, Canada

[73] Assignee: Domtar Inc., Montreal, Canada

[21] Appl. No.: 196,766

[22] Filed: Oct. 14, 1980

[51] Int. Cl.³ .............................................. C10B 17/00
[52] U.S. Cl. .................................... 423/244; 423/242; 110/345
[58] Field of Search .......... 423/242 A, 242 R, 244 A, 423/244 R; 110/343, 345

[56] References Cited

U.S. PATENT DOCUMENTS 3,870,480 3/1975 Moss .................................... 423/244
4,039,304 8/1977 Becthold et al. .................... 423/242
4,185,080 1/1980 Rechmeier .......................... 423/242

Primary Examiner—O. R. Vertiz
Assistant Examiner—Gregory A. Heller

[57] ABSTRACT

System for reducing the emission of sulfur particularly for high sulfur coal combustion in a fluidized bed by injecting limestone into the bed and calcining the limestone in the bed to form lime, reacting a portion of the lime so formed with a portion of the $SO_2$ generated in the bed, removing the excess of material containing lime so generated from the bed, slaking said excess lime in water, then contacting flue gases leaving the fluid bed and containing $SO_2$ with the lime slurry so formed thereby to remove a further significant portion of the generated $SO_2$ from the flue gas.

4 Claims, 3 Drawing Figures

FLUIDIZED BED SULFUR DIOXIDE REMOVAL

FIELD OF THE INVENTION

The present invention relates to sulfur dioxide removal from flue gases generated in fluidized bed combustion, more particularly the present invention relates to the combination of in-the-bed desulfurization with flue gas desulfurization to separate sulfur from the exhaust gases.

PRIOR ART

There are various flue gas desulfurization processes for removing $SO_2$ from the exhaust gases from a combustion process to prevent the sulfur from passing to the atmosphere as sulfur dioxide and forming what is generally referred to as acid rain. Such process includes, for example, spray drying, wet scrubbing, etc. of the flue gases. Scrubbing of flue gases in a wet scrubbing operation requires a low absorbant requirement say about 1–1.5 mole of limestone/mole of sulfur in the flue gas or 1–1.5 stoicheiometric relationship to achieve the desired degree of $SO_2$ removal. Such scrubbing operation generally use lime or limestone or the like as the scrubbing chemical to chemically combine with the sulfur and "fix" the sulfur. The resultant product is a wet sludge containing the combined sulfur.

It has also been proposed to spray and dry the absorbant slurry in the flue gases to remove the sulfur from these gases, this technique results in a dry product that may be separated from the flue gas in a bag house or like equipment such as electro-static precepitator and results in a dry solid waste that may be disposed of more easily. The spray drying technique generally requires the use of more expensive chemicals such as lime rather than limestone and it is more economical to use the wet scrubbing process on high sulfur fuels such as high sulfur coals containing more than about 1-2% sulfur.

The use of a fluidized bed boiler has never really been accepted commercially, probably because the expected cost advantages never really materialized so that the total cost of operating a fluidized bed boiler system is approximately the same cost as a conventional system with a significant portion of this cost being incured to provide sulfur removal to meet government standards.

Fluidized bed boilers may remove sulfur by the addition of calcium carbonate directly to the furnace. However, this technique is not normally applied to conventional boilers since in conventional boilers the calcium sulfate and/or sulfite formed may cause slagging of the boiler tubes and sometimes fusion of the ash.

When the calcium carbonate is added to the bed of a fluidized bed combustion unit, the carbonate is calcined to form lime which combines with the sulfur to form calcium sulfate and is normally removed in the ash. The efficiency of removal of sulfur is relatively low and requires a high ratio of calcium to sulfur (about 5 times the stoicheiometric requirement) to absorb the requisite amounts of sulfur to meet the government standards e.g. 90% sulfur removal. Thus, there is a large excess of lime in the ash from the fluidized bed and this lime presents not only an absorbant waste but also a disposal cost problem. It has been proposed to remove this lime and re-inject it back to the unit but the savings attainable are not adequate. Such fluidized bed boilers burning coal have not been found to have economic advantages over conventional furnaces with conventional flue gas desulferization equipment.

BRIEF DESCRIPTION OF THE INVENTION

It is thus the main object of the present invention to provide an improved fluidized bed boiler system having a more economical combined system for capturing sulfur released during combustion in a fluidized bed unit.

Broadly the present invention comprises burning a fuel containing sulfur in a fluidized bed unit, injecting a calcinable stone such as calcium carbonate, magnesium carbonate or the like into said bed, calcining said stone in said bed, combining a portion of said calcined stone with sulfur released in said bed, conducting flue gases from said bed to a flue gas desulfurization unit, extracting a solid residue from said bed said residue containing calcined stone not combined with sulfur in said bed, slaking said calcined stone in said residue to provide an aqueous slurry, utilizing said aqueous slurry to extract sulfur from said flue gases and form a byproduct in said desulfurization unit, separating said byproduct from said flue gases thereby to reduce significantly the sulfur content in the flue gases emitted from the system.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
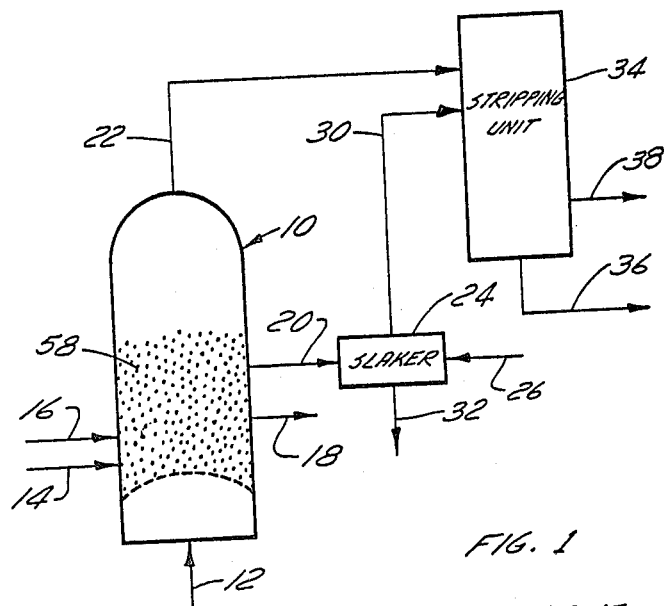
FIG. 1 is a schematic illustration of one form of the present invention.

The arrangement shown in FIG. 1 includes a fluidized bed boiler system schematically illustrated at 10 having a fluidizing air input at 12, a fuel input at 14 and a suitable calcinable stone input at 16. The term "calcinable stone" when used herein is intended to include one or more of the group consisting of magnesite, limestone, dolomite, dolomitic limestone and any other suitable calcinable material but for convenience the disclosure will refer to as limestone and to the calcined material as lime. Heat is extracted from the boiler system as schematically illustrated at 18 and solid residue at 20 while the flue gases leave the boiler system via line 22.

The residue leaving the system via line 20 passes to a slaker 24 wherein it is contacted with water entering via line 26, and forms a lime slurry that leaves via line 30 while the dregs are removed via line 32. These dregs may be used for any suitable purpose such as land fill. The slurry in line 30 contacts a gas in line 22 in a suitable $SO_2$ stripping unit 34 from which dregs are separated via line 36 and the cleaned gas leaves via line 38.

Figure 2:
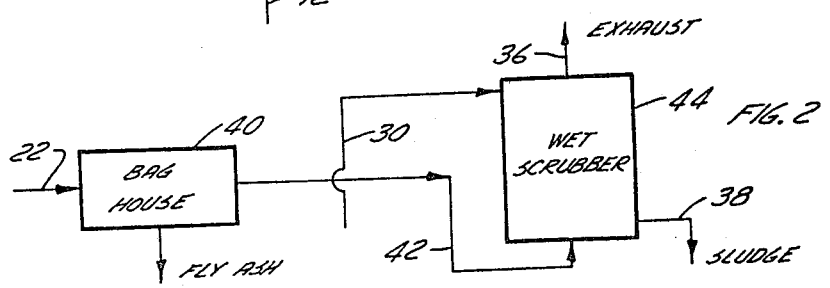
FIG. 2 is a schematic illustration of a wet scrubber stripping system.

In the FIG. 2 embodiment the stripping unit 34 is in the form of a conventional scrubber arrangement wherein the flue gas in line 22 is stripped of fly ash in an electrostatic precipitator or bag house 40 and passes via line 42 into wet scrubber 44. The slurry in line 30 enters the scrubber and contacts the gas in the scrubber 44 so that the reactant or absorbant in the slurry may react with the $SO_2$ in the flue gas to form a sludge that leaves the system via line 38, while the clean exhaust gases leave the system via line 36 as described hereinabove.

Figure 3:
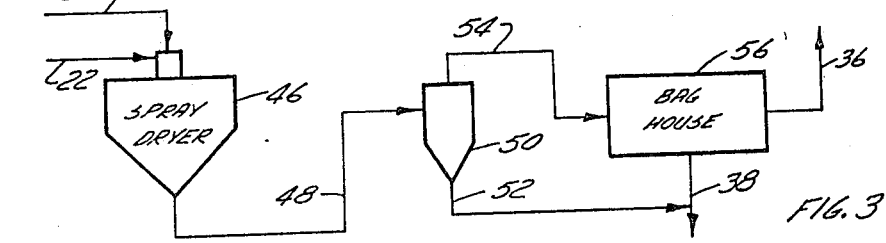
FIG. 3 is a schematic illustration of a spray dryer stripping system.

In the FIG. 3 embodiment the stripping unit 34 comprises a spray dryer 46 into which the flue gas is introduced via line 22 and the slurry via line 30. The resultant gas together with entrained solids including fly ash etc. leaves the spray dryer 46 via line 48 and passes through a cyclone 50 to remove some of heavier material or solids via line 52 and the partially cleaned gas passes via line 54 into a bag house or the like 56 from which the residue is removed via line 38 and the clean gases via line 36. The solid residues from the cyclone 50 and bag house 56 are dry and thus more easily disposed of.

In the operation of the arrangement shown in FIG. 1 the fluidized air enters the furnace via line 12 and forms a fluidized bed of particles, generally limestone and lime, as indicated at 58. Fuel is injected via line 14 and burned in the bed to generate heat, some of which is extracted as schematically illustrated by line 18 generally in the form of steam.

As a first stage in reducing the sulfur emissions from the system limestone or the like is injected into the fluidized bed as indicated at 16. This limestone is converted to lime by the heat in the bed and a portion of the lime so formed reacts with sulfur to form calcium sulfur compounds.

As above indicated, the efficiency of sulfur removal in the bed is relatively low requiring a high ratio of calcium to sulfur to extract the requisite amount of the sulfur because of the minimum availability of the reacting surface of the lime particles to the sulfur for reaction. Such installations generally require a lime consumption in the order of between about 4 and 6 times the stoicheiometric requirement and only a minor portion of the calcium (lime) generated in the bed is combined with the sulfur so that the ash contains a significant amount of unreacted lime.

When practicing the present invention the mole ratio of calcium to sulfur added to the fluid bed is reduced significantly to not more than approximately 3 to 1 and generally about 1 to 1.5 to 1 so that the amount of sulfur reacted with calcium within the bed is reduced significantly. Only about 30 to 60% of the sulfur combines with the calcium in the bed leaving 70 to 40% of the sulfur released during the combustion uncombined and free to pass out of the furnace in the flue gas in the line 22.

The ash leaving the fluidized bed via line 20 (even though much less calcium enters the furnace, say 1.5 to 1 rather than 5 to 1) still contains a significant quantity of unreacted lime generated in the fluid bed. This lime is contacted with the water entering the slaker 24 via line 26, and the slurry formed carried out of the slacker via line 30. The heavy fraction of solids that settle to the bottom of the slaker leave the slaker 24 via line 32 and are disposed of. It will be apparent that the constant of lime in the slurry in line 30 will be less than the quantity of lime introduced into the fluid bed as limestone via line 16 however, in the flue gas stripping systems 34 as illustrated for example in FIG. 2 and 3 the mole ratio of calcium to sulfur in the flue gas is normally closer to a 1-1½ to 1 ratio and since about 30-60% the sulfur has been combined with calcium in the fluidized bed the amount of sulfur in the gas in line 22 is significantly less than what normally would have been in the flue gas and therefore the total amount of lime necessary to strip the sulfur from the partially cleaned flue gas will be significantly less.

This arrangement is particularly suited to high sulfur coals since it removes the sulfur in two stages and permits, in some cases, the use of spray drying technique for example as shown in FIG. 3 to combine with that portion of the sulfur remaining in the flue gas to reduce the sulfur content of the flue gas to acceptable limits. Generally spray drying techniques could not economically be used per se on high sulfur fuels.

As above indicated it is not necessary to utilize spray drying, other flue gas desulfurization means may be used. In some cases, it may be preferred to use a wet scrubbing method in combination with the addition of a calcinable stone such as limestone, dolomitic limestone or the like directly into the fluidized bed. When such a combination of direct addition to the bed with a flue gas desulfurization means is used, it has been found that if only about 30–60% of the sulfur is removed, in the fluidized bed by combining with the calcined stone and the mole ratio of calcium (equivalent ratio of other calcinable stones) to sulfur added is significantly less than what would normally be required to remove substantially all of the sulfur in the bed. Further, if the ash or residue from the fluidized bed is slaked to provide a slurry containing calcined material i.e. lime and this material used as a scrubbing solution in a conventional flue gas desulfurization unit the ratio of calcium (calcinable stone) added to the bed to sulfur is about the same as that required in a conventional flue gas desulfurization unit such as a wet scrubber. When the combination of bed addition and flue gas desulfurization is used, the amount of sulfur that has to be removed from the flue gas is now reduced significantly since up to 60% of the sulfur is removed in the fluidized bed and the flue gas desulfurization unit may be of reduced size. Furthermore, since the fluidized bed calcines the stone (at little, if any, additional cost) the scrubbing solution is now lime instead of limestone (although limestone need only be purchased) thereby further reducing the size of the scrubbing unit and the pressure drop (energy loss) there across. The combination of addition of limestone to remove only a portion (up to about 60%) of the sulfur in the bed and removal of the remainder in a flue gas desulfurization unit reduces significantly both the operating cost and capital cost of the overall system.

The following provides a comparison of a conventional fluidized bed boiler wherein the requisite amount of sulfur is removed directly in the bed and one operated in accordance with the teachings of the present invention.

Coal having a composition containing 16% ash and 3.5% sulfur and a BTU value of approximately 10,500 BTU/lb was fired in both cases and limestone containing 94.1% calcium carbonate, 3.3% magnesium carbonate, 2% moisture and 0.6% other materials used as the absorbing chemical. Air at 0.015 lbs per pound of dry coal and 20% in excess over that required form combustion of the coal was used as the fluidizing and oxygen providing medium.

Case 1, following the prior art, 90% of the sulfur was removed by combining with lime formed in the bed. The calcium to sulfur ratio was 5 to 1. Case 2, following the present invention using a wet scrubber, a calcium to sulfur ratio of 1.5 to 1 was maintained by the addition of limestone and 60% of the sulfur combined with the lime in the bed.

The residue in the fluidized bed i.e. the solid waste material withdrawn from the bed had the compositions and quantities indicated in Table 1.

TABLE 1

| Composition | lb./hr. (1) Case 1 | lb./hr. (2) Case 2 |
|---|---|---|
| CaO (4) | 101,010 | 22,574 |
| MgSO4 | 10,479 | 3,554 |
| CaSO4 | 34,887 | 30,600 |
| Other (ash and inerts) | + | + |
| TOTAL | 146,376 + | 56,728 + |

In case 1, the flue gas leaving the fluidized bed and thus the system was 0.6 lbs sulfur/mm BTU's from the system.

In case 2, the gas leaving the furnace contained approximately 2.4 lbs sulfur/mm BTU's, however, this material was then treated in a conventional scrubber and about 90% of the $SO_2$ was scrubbed therefrom so that the flue gas leaving the system contained about 0.24 lbs of sulfur/mm BTU's.

Table 2 provide a comparison fluidized bed units utilizing only calcium addition to the bed for sulfur removal with systems constructed in accordance with the present invention but using different limestone sources.

It will be apparent the instant system provides an on site source of lime for the flue gas desulfurization stage by calcining the limestone within the bed 38 and using the lime so generated in a separate flue gas desulfurization step thereby to significantly improve the efficiency of utilization of the lime.

Modification of the invention will be evident to those skilled in the art without departing from the spirit of the invention as defined in the appended claims.

TABLE 2

PRESSURIZED FLUIDIZED BED HIGH SULFUR COAL COMBUSTION AND DESULFURIZATION EFFICIENCY WITH AND WITHOUT AN FGD SYSTEM

| Limestone Supply (mole Ca/mole S in feed) | Expected Sulfur absorbed in FBC residue[1] (mole/mole S in feed) | Residual Sulfur or $SO_2$ in flue gas (A) (mole/mole S in feed) | Max. Available CaO in FBC residue[2] (B) (mole/mole S) | Predicted Slakable CaO in FBC residue[3] (0.6 B) (mole/mole S) | Ratio of Slakable CaO to flue gas $SO_2$ content (0.6 B/A) (mole CaO/) | Predicted $SO_2$ removal effic. of FGD system [4] (%) | Overall Desulfurization Effic. (%) |
|---|---|---|---|---|---|---|---|
| Grove | | | | | | | |
| 5.0 | 0.90 | 0.10 | 4.10 | 2.46 | | (5) | 90.0 |
| 4.0 | 0.86 | 0.14 | 3.14 | 1.88 | | (5) | 86.0 |
| 3.0 | 0.82 | 0.18 | 2.18 | 1.31 | | (5) | 82.0 |
| 2.0 | 0.69 | 0.31 | 1.31 | 0.79 | | (5) | 69.0 |
| 1.3 | 0.57 | 0.43 | 0.73 | 0.44 | 1.02 | 92.1 | 96.6 |
| 1.2 | 0.54 | 0.46 | 0.68 | 0.41 | 0.89 | 80.2 | 90.9 |
| 1.1 | 0.51 | 0.49 | 0.59 | 0.35 | 0.71 | 54.3 | 82.0 |
| 1.0 | 0.48 | 0.52 | 0.52 | 0.31 | 0.60 | 53.7 | 75.9 |
| Germany | | | | | | | |
| 10 | 0.85 | 0.15 | 9.15 | 5.49 | | (5) | 85 |
| 5 | 0.79 | 0.21 | 4.21 | 2.53 | | (5) | 79 |
| 4 | 0.75 | 0.25 | 3.25 | 1.95 | | (5) | 75 |
| 3 | 0.70 | 0.30 | 2.30 | 1.38 | | (5) | 70 |
| 2 | 0.60 | 0.40 | 1.40 | 0.84 | | (5) | 60 |
| 1.4 | 0.43 | 0.57 | 0.97 | 0.58 | 1.02 | 92 | 95 |
| 1.3 | 0.40 | 0.60 | 0.90 | 0.54 | 0.90 | 81 | 89 |
| 1.2 | 0.38 | 0.62 | 0.82 | 0.49 | 0.79 | 71 | 82 |
| 1.1 | 0.35 | 0.65 | 0.77 | 0.46 | 0.71 | 64 | 77 |
| 1.0 | 0.32 | 0.68 | 0.68 | 0.41 | 0.60 | 54 | 69 |
| Greer | | | | | | | |
| 5.0 | 0.90 | 0.10 | 4.10 | 2.46 | | (5) | 90 |
| 4.0 | 0.86 | 0.14 | 3.14 | 1.88 | | (5) | 86 |
| 3.0 | 0.73 | 0.27 | 2.27 | 1.36 | | (5) | 73 |
| 2.0 | 0.48 | 0.52 | 1.52 | 0.91 | | (5) | 48 |
| 1.5 | 0.36 | 0.64 | 1.14 | 0.68 | 1.06 | 96 | 97 |
| 1.4 | 0.33 | 0.67 | 1.07 | 0.64 | 0.96 | 86 | 91 |
| 1.3 | 0.31 | 0.69 | 0.99 | 0.59 | 0.86 | 77 | 84 |
| 1.2 | 0.26 | 0.72 | 0.92 | 0.55 | 0.76 | 69 | 78 |
| 1.1 | 0.26 | 0.74 | 0.84 | 0.50 | 0.68 | 61 | 71 |

TABLE 2-continued
PRESSURIZED FLUIDIZED BED HIGH SULFUR COAL COMBUSTION AND DESULFURIZATION EFFICIENCY WITH AND WITHOUT AN FGD SYSTEM

| 1.0 | 0.23 | 0.77 | 0.77 | 0.46 | 0.60 | 54 | 65 |
|---|---|---|---|---|---|---|---|

[1] For typical 3.5% sulfur Eastern U.S. Coal - "Pressurized Fluidized Bed Coal Combustion and Sorbent Regeneration" Lawrence A. Ruth, R. C. Hoke, M. C. Nutkis and R. R. Bertrand. Proceedings of the 5th International Conference on Fluidized Bed Combustion, Washington, D.C. V3, p. 756-772, Dec. 1977. "Prediction of Limestone Requirements for $SO_2$ emission Control in Atmospheric Pressure Fluidized Bed Combustion" R. B. Snyder, W. I. Wilson, and I. Johnson. Proceedings of the 5th International Conference on Fluidized Bed Combustion, Washington, D.C. V3, p. 748-759. Dec. 1977.
[2] Assuming a complete calcination of limestone in feed.
[3] Based on literature data, using a typical industrial slaking system which could produce an $SO_2$ absorbing slurry containing at least 60% of CaO present in FBC residues. "Utilization of the By-products from Fluidized Bed Combustion Systems". L. J. Minnick, R. H. Miller. Proceedings of the 6th International Conference on Fluidized Bed Combustion, Atlanta, Georgia, April 1980.
[4] Assuming a typical FGD scrubbing system with about 10-15 in $H_2O\Delta P$ and that slaked CaO slurry would be used to remove the residual $SO_2$ in the flue gas stream, i.e. up to 90% lime utilization. "R-C/BAHCO for combined $SO_2$ and Particulate Control", N. J. Stevens. Symposium on Flue Gas Desulfurization Las Vegas, Nevada. V.II, p. 1082-1114. March 1979.
[5] The fluid bed operation is without an FGD system.

I claim:

1. Method of capturing sulfur released in the fluid bed oxidation of sulfur containing fuels comprising injecting a suitable calcinable material selected from one or more of group consisting of limestone, dolomitic limestone, dolomite, and magnesite into said bed, calcining said material to form calcined material in said bed, combining a portion of said calcined material generated in said bed with $SO_2$ formed by oxidation of the sulfur in said fuel to generate a combined product, removing said combined product together with unreacted calcined material from said fluidized bed, conducting flue gases containing the remainder of said $SO_2$ from said fluidized bed unit, slaking said calcined material extracted from said bed in water, to form a slurry contacting said flue gases with said slurry of the slaked material to react $SO_2$ with said slaked material to form a second combined product and separating said second combined product from said flue gas.

2. Method as defined in claim 1 wherein said flue gas and said slaked material are contacted in a spray dryer to form said second combined product as a dry product.

3. A method as defined in claim 1 wherein said slaked material and said flue gas contact each other in a wet scrubber.

4. A method as defined in claims 1, 2 or 3 wherein said calcinable material is limestone.

* * * * *